(12) United States Patent
Dahl

(10) Patent No.: US 6,330,765 B1
(45) Date of Patent: Dec. 18, 2001

(54) FRAME FOR A SLIDING WINDOW HAVING A MOVABLE TRACK SECTION FOR REMOVING THE WINDOW

(75) Inventor: Jeffrey A. Dahl, Lisbon, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 09/350,689

(22) Filed: Jul. 9, 1999

(51) Int. Cl.$^7$ ................................ E06B 3/46; E06B 3/60
(52) U.S. Cl. .................................. 49/453; 49/463; 49/465
(58) Field of Search ........................... 296/201, 146.15, 296/146.16; 49/380, 463, 465, 453, 169, 504

(56) References Cited

U.S. PATENT DOCUMENTS

| | | | |
|---|---|---|---|
| 628,104 | * | 7/1899 | Marshall ................................ 49/149 |
| 1,127,316 | * | 2/1915 | Taylor ................................... 49/439 |
| 1,716,044 | * | 6/1929 | Goldsmith et al. .................... 49/453 |
| 3,744,186 | * | 7/1973 | Tantlinger ............................. 49/463 |
| 3,805,452 | * | 4/1974 | Scott ..................................... 49/454 |
| 3,908,730 | * | 9/1975 | Goss et al. ............................. 160/90 |
| 4,372,082 | * | 2/1983 | Pagel ...................................... 49/62 |
| 4,592,168 | * | 6/1986 | Struckmeyer ......................... 49/177 |
| 4,611,850 | * | 9/1986 | Fujikawa ............................. 296/201 |
| 5,076,635 | * | 12/1991 | Larkin et al. ................... 296/146.16 |
| 5,076,637 | * | 12/1991 | Larkin et al. ..................... 296/190.1 |
| 5,450,917 | * | 9/1995 | Goddard ............................. 180/89.12 |
| 5,707,101 | * | 1/1998 | Rice ..................................... 296/195 |
| 5,791,727 | * | 8/1998 | Doescher et al. ................. 296/190.1 |
| 5,799,449 | * | 9/1998 | Lyons et al. ....................... 52/204.51 |

* cited by examiner

Primary Examiner—Gregory J. Strimbu
(74) Attorney, Agent, or Firm—Westman, Champlin & Kelly, P.A.

(57) ABSTRACT

A skid steer loader cab has window openings in the cab side walls. At least one of the window openings includes a window having a frame and two window panels mounted on the inside of the cab wall. One of the window panels is fixed in position and the other is sliding. The sliding window panel permits an operator to open a section of the window for ventilation or fresh air inlet purposes. A frame track section which supports the lower edges of the window panels is movable to a release position so both the panels can be quickly removed for cleaning.

9 Claims, 6 Drawing Sheets

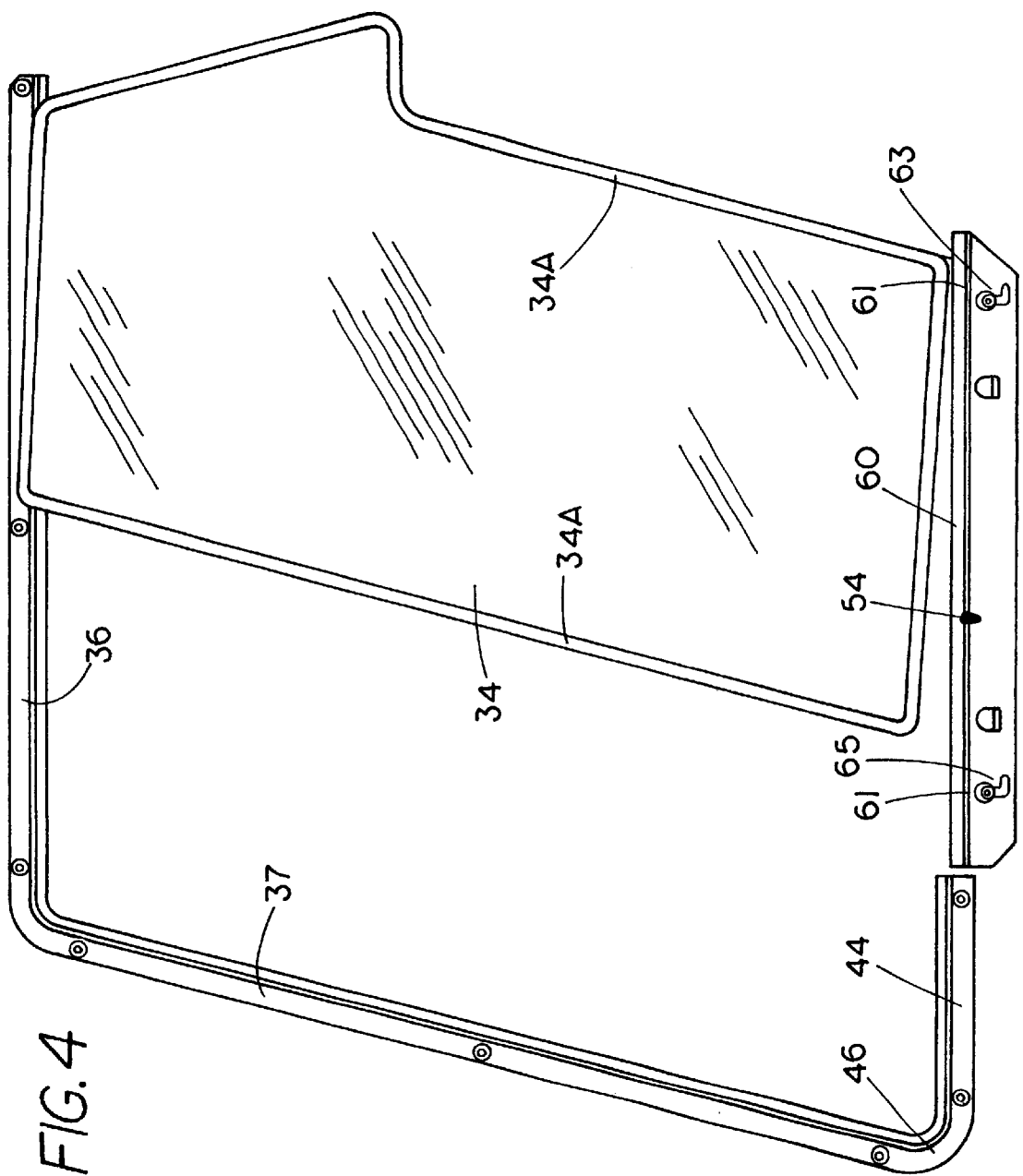

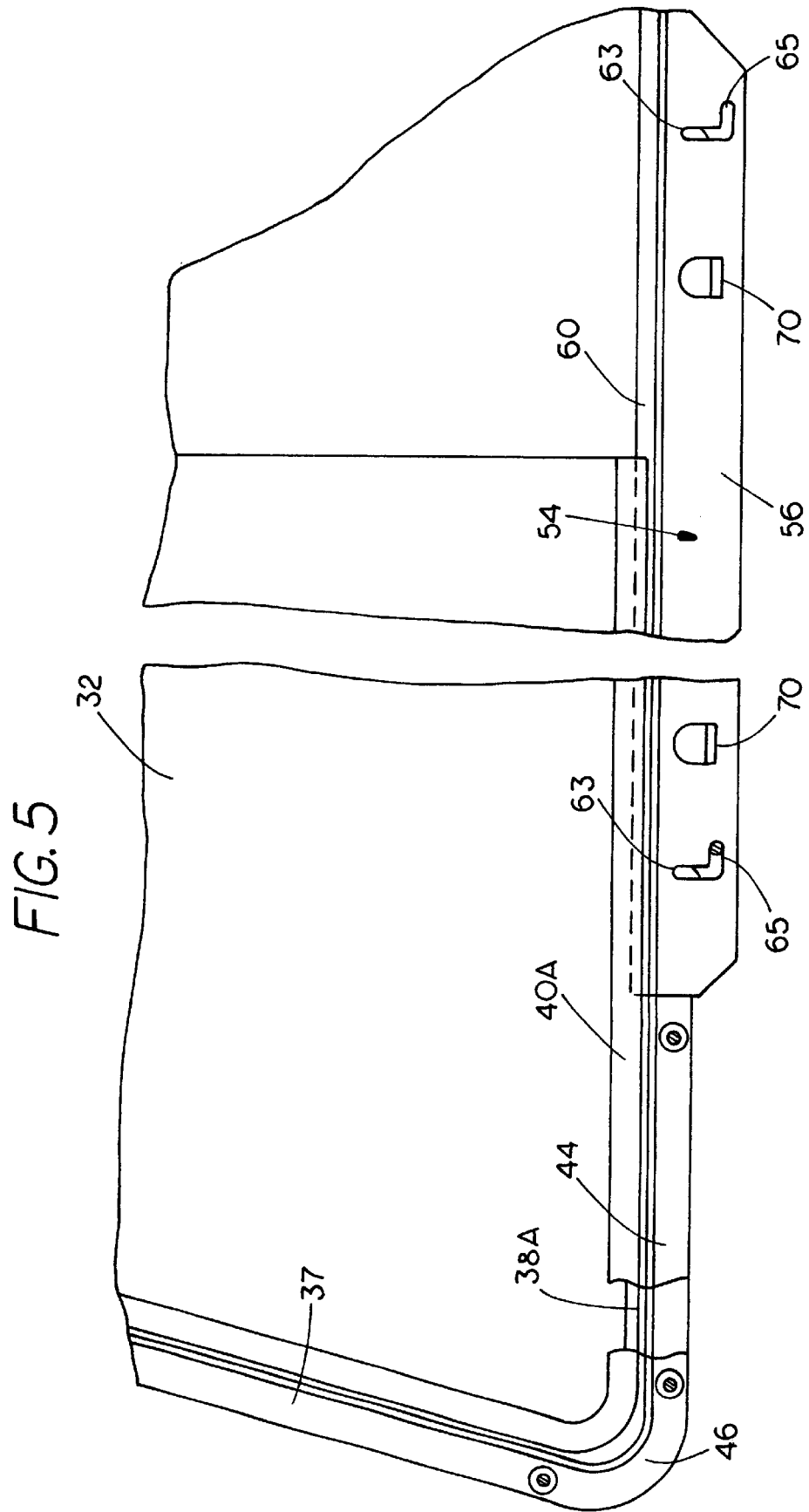

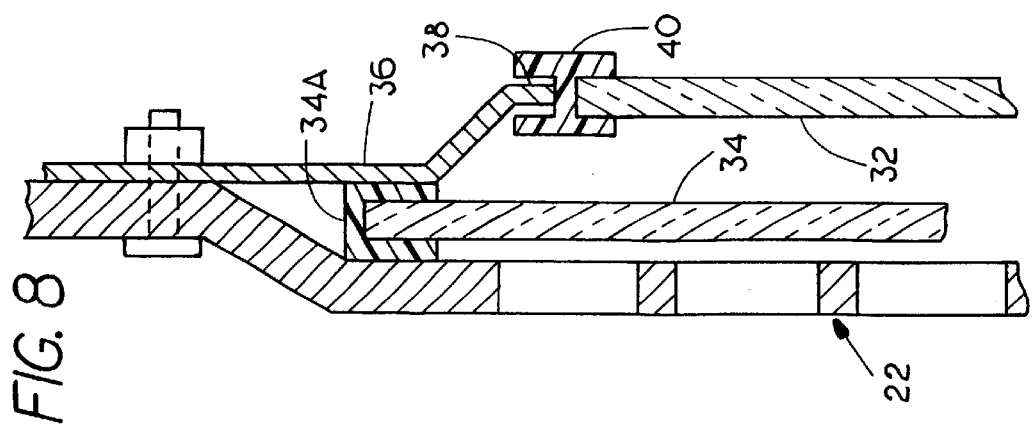
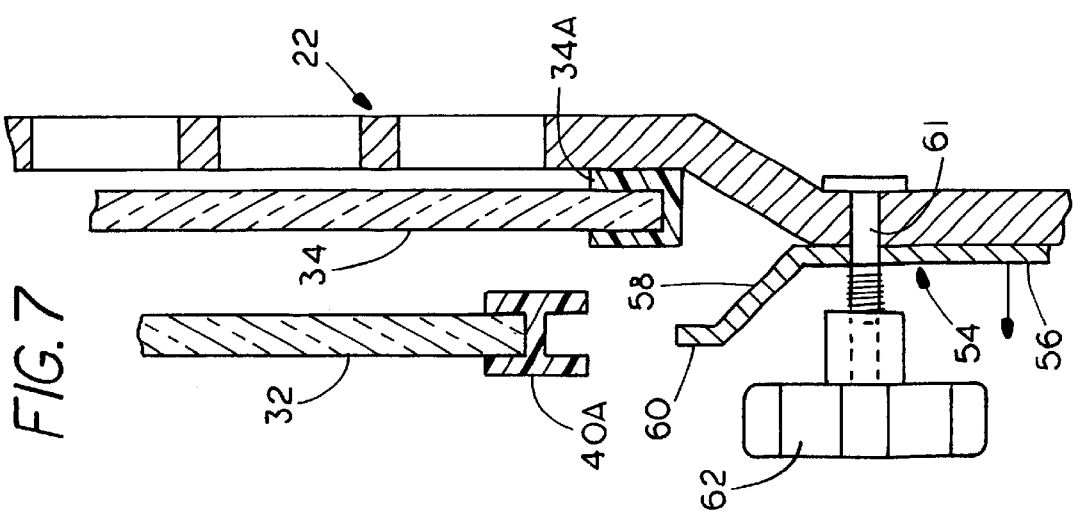
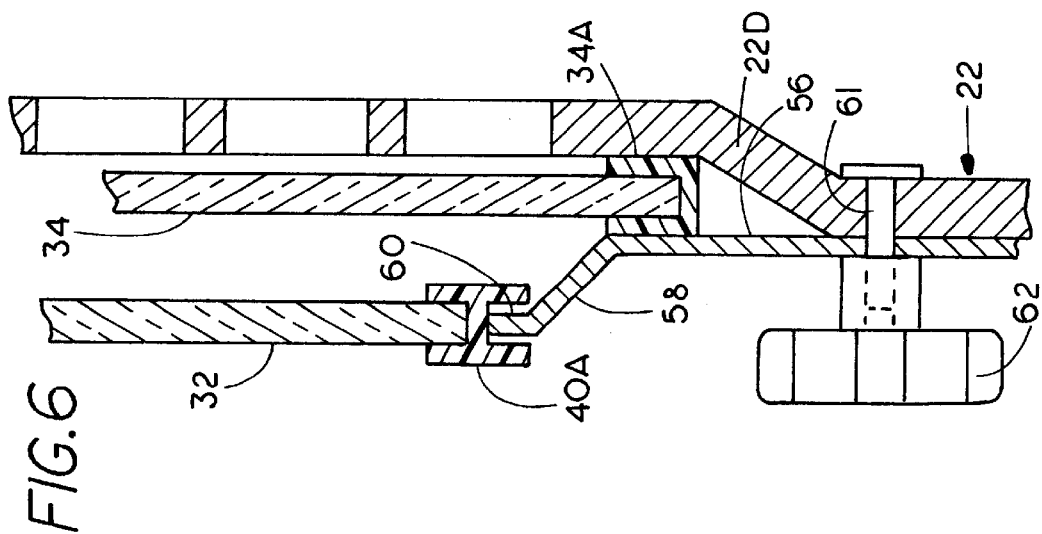

FRAME FOR A SLIDING WINDOW HAVING A MOVABLE TRACK SECTION FOR REMOVING THE WINDOW

BACKGROUND OF THE INVENTION

The present invention relates to mounting side windows in a skid steer loader cab that has a steel outer screen with the window mounted on the interior and supported on a window frame. The side window includes a fixed panel and a horizontally sliding openable panel. The lower portion of the window frame has a section that can be released and easily and quickly be guided to a position to permit removal of the sliding window panel and the fixed window panel for service, cleaning or for replacement.

In the prior art, it has been known to have steel open mesh screens along the sides of operator cabs for skid steer loaders, and it is also desired to have windows that can be put on the interior of the operator cab so that during inclimate weather, the skid steer loader can be operated in comfort. The windows are useful when either heating or air conditioning of the interior of a cab is desired. However, the windows do become dirty and need to be cleaned from time to time. Because the exterior of the windows is covered with a steel screen that is fixed on the cab frame, cleaning the outside surfaces requires removal of the windows. This has been a problem with existing window frames that have to be completely removed in order to remove the window. The present invention provides a quickly movable portion of the window frame to permit both the sliding window panel and the fixed window panel to be removed for cleaning or other purposes.

SUMMARY OF THE INVENTION

The present invention relates to a frame for supporting windows on a skid steer loader cab which has integral, heavy, open mesh screens as part of the cab side wall, with the windows mounted on the interior. The windows are preferably made in two panels or sections, one of which is fixed, and the other of which is sliding so that the window can be moved to open an area of the side screen for ventilation. The sliding panel is mounted on tracks, while the fixed panel is held by the window frame.

A section of the lower window frame has a sliding window panel track and is movable along guide slots so that it can be dropped or moved away from its working position where it supports will engage a movable window panel. The frame section will then be disengaged from the sliding window panel so it can easily be removed. The fixed window panel also can then be removed by slipping it out of the frame and over the disengaged frame section.

The movable frame section is guided along slots to permit it to be positively positioned in its working position where it will guide the movable window panel and hold the bottom portion of the fixed glass panel is position. In its release position both window panels can be removed across the opening above the movable frame section.

BRIEF DESCRIPTION OF THE DRAWINGS

FIG. 4 is an exterior view with the cab wall and frame removed with the sliding window panel removed, and the lower frame section in its released position which permits removal of the fixed window panel;

FIG. 5 is a fragmentary enlarged view from the exterior showing the lower portion of the window frame and illustrating the movable window panel supported by the movable frame track section with the fixed panel removed;

FIG. 6 is a fragmentary sectional view taken along line 6—6 in FIG. 2;

FIG. 7 is a fragmentary sectional view taken along line 7—7 in FIG. 3; and

FIG. 8 is a fragmentary sectional view taken along line 8—8 in FIG. 3.

DETAILED DESCRIPTION OF THE ILLUSTRATIVE EMBODIMENTS

Figure 1:
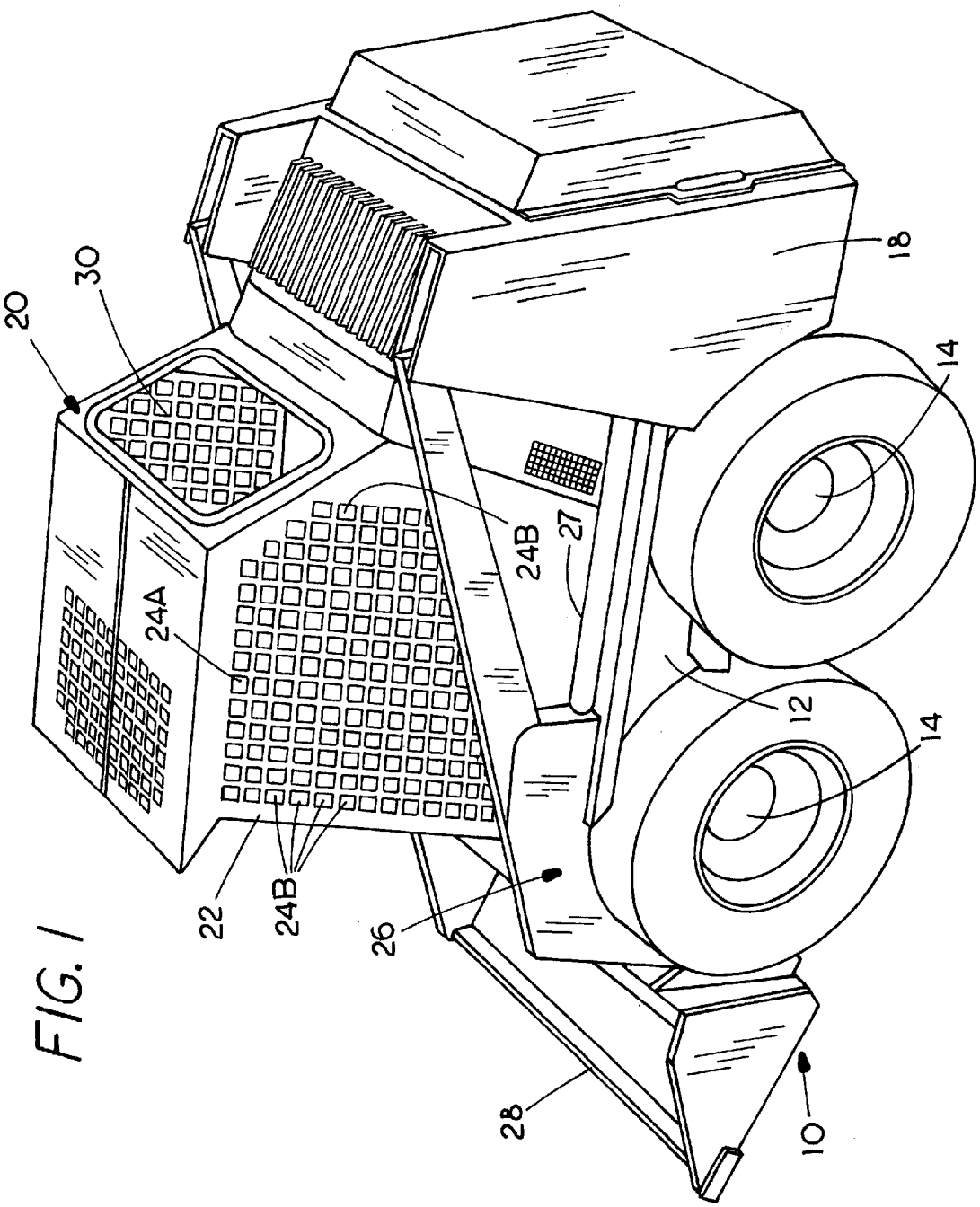
FIG. 1 is a perspective schematic view of a typical skid steer loader illustrating the side screen wall onto which the window panels of the present invention are installed on the interior thereof.

A skid steer loader 10, is shown schematically, and includes a frame 12 mounted on wheels 14 that are driven through a suitable power train such as hydraulic motors that are driven by hydraulic pumps. The pumps are driven by an engine mounted in an engine compartment 18 that is to the rear of an operator's cab or enclosure 20. In the form shown, the operator's cab has a pair of side walls 22, formed to surround open mesh or screens 24A. The screens form openings for viewing the exterior. Window assemblies 30 are mounted on the interior of the walls 22 to cover the openings. The screens 24A are made by punching out individual square openings 24B separated by bars. The loader has lift boom arms 26 and a working bucket 28 at the front. The arms can be operated in a known manner with hydraulic cylinders 27 controlled by an operator. The boom arms 26 move up and down along the sides of the loader, as shown.

In order to provide a cab with window assemblies 30, glass window panels can be mounted on the inside of screens 24A. These glass window panels have to be removed for cleaning because screens 24A are not removable. Also, it is desired to have at least one of the glass panels movable so that it can be opened for ventilation purposes, and thus, the window assemblies 30 are made up of a pair of glass window panels 32 and 34. The panel 32 is made so that it can slide rearwardly along horizontal top and bottom tracks to permit ventilation along the forward side of the side wall opening.

Figure 2:
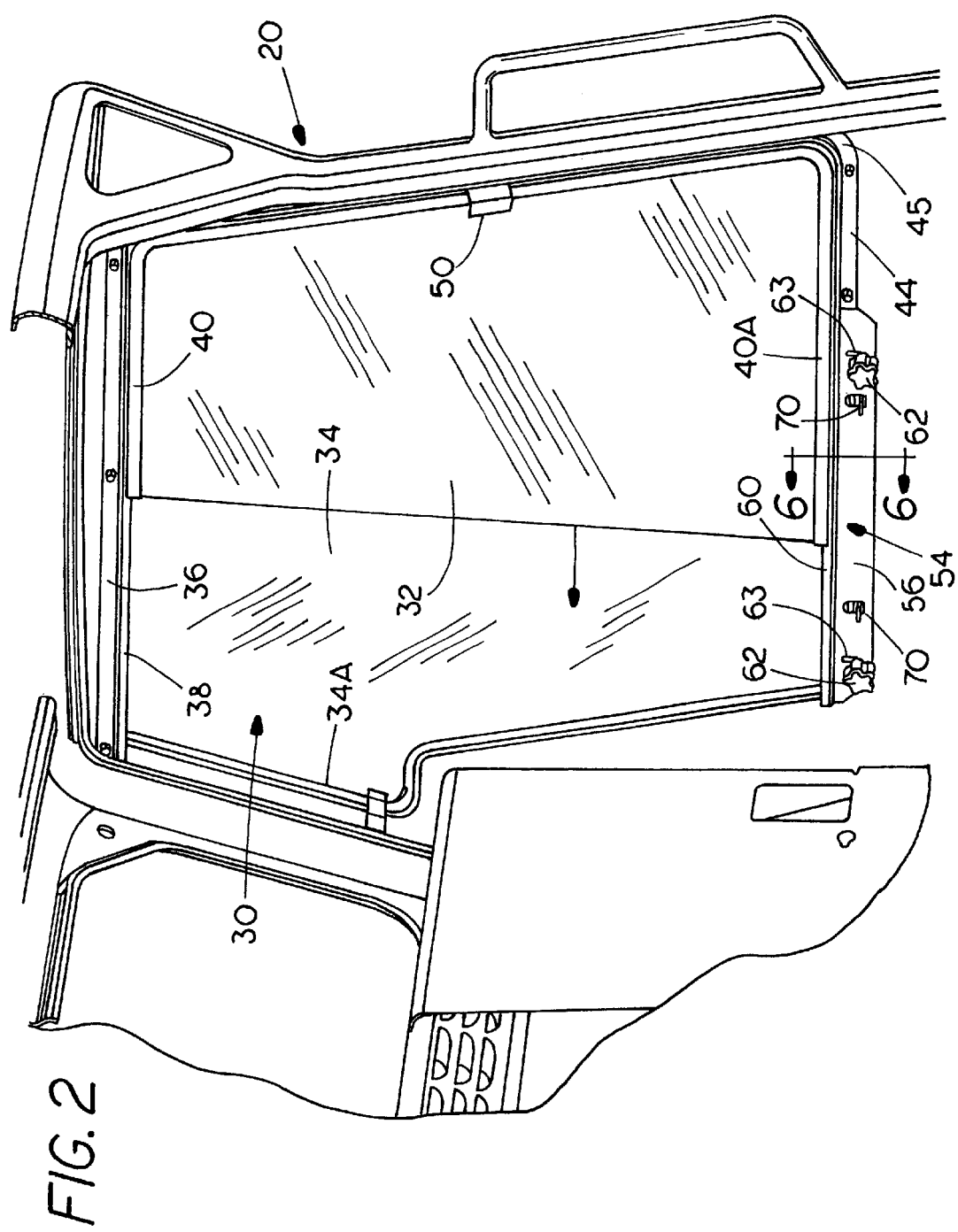
FIG. 2 is an interior view of the side of a cab of a skid steer loader such as that shown in FIG. 1 illustrating the glass window panels in position covering the window opening in the side of the cab of the loader.

As shown in FIG. 2, the fixed glass panel 34 is held along the top with a fixed window frame top section 36 that will clamp a molding or compressible seal 34A that is positioned on the top, rear and bottom edges of the fixed window panel 34. Sliding glass window panel 32 is supported for sliding along the top frame section 36 on an off-set track leg 38 that extends downwardly, and which is received in an upwardly facing U-shaped groove of a guide channel 40 mounted on the top, bottom and front side of sliding glass window panel 32.

The cross section of track section 36 is shown schematically in FIG. 8, for example, and it can be seen that the top frame section 36 is bolted to the side wall and will compress and hold the upper length of the molding or seal 34A around the fixed window panel 34 against the side wall 22 while slightly compressing seal 34A. The track leg 38 provides a sliding guide for the sliding window panel 32. A track leg also extends along the front vertical edge of the window opening and the sliding panel so that the track channel 40 on the front edge of the sliding panel 32 can seat against such a track leg. The frame having a cross section like frame section 36 continues downwardly along the front edge of the window with frame section 37 to a lower window frame section 44 at the front lower edge of the window that extends only partway back from a front corner 45. The frame section 44 has an upright track leg 38A (FIG. 5) that supports a lower section of U-shaped channel 40A on the lower edge of the sliding panel 32 in the same way as that shown in FIG. 8, except there is no fixed window panel held at the front portion of the window.

The seal 34A at the rear edge of the fixed panel 34 can be held against the edge of the side wall 22 of the cab with a suitable latch or retainer indicated generally at 46. This is a simple latch that can be made in any desired manner. It can be a clip that forms a U-shaped receptacle to frictionally hold the seal 34A, or it can be a quarter turn latch that would hold the seal 34A against the side wall of the cab for preventing the fixed panel from rattling or from leaking substantial amounts of air. A quarter turn latch can be rotated to release the panel 34. Since the side wall or side screen of the cab is recessed for the window, as shown in FIGS. 6, 7 and 8, a flat strap can be bolted to the wall and extended to overlie the panel 34 to hold it in place. The panel 34 can be slipped out from the tab for removal of the panel, and slid back into place for installation.

Figure 3:
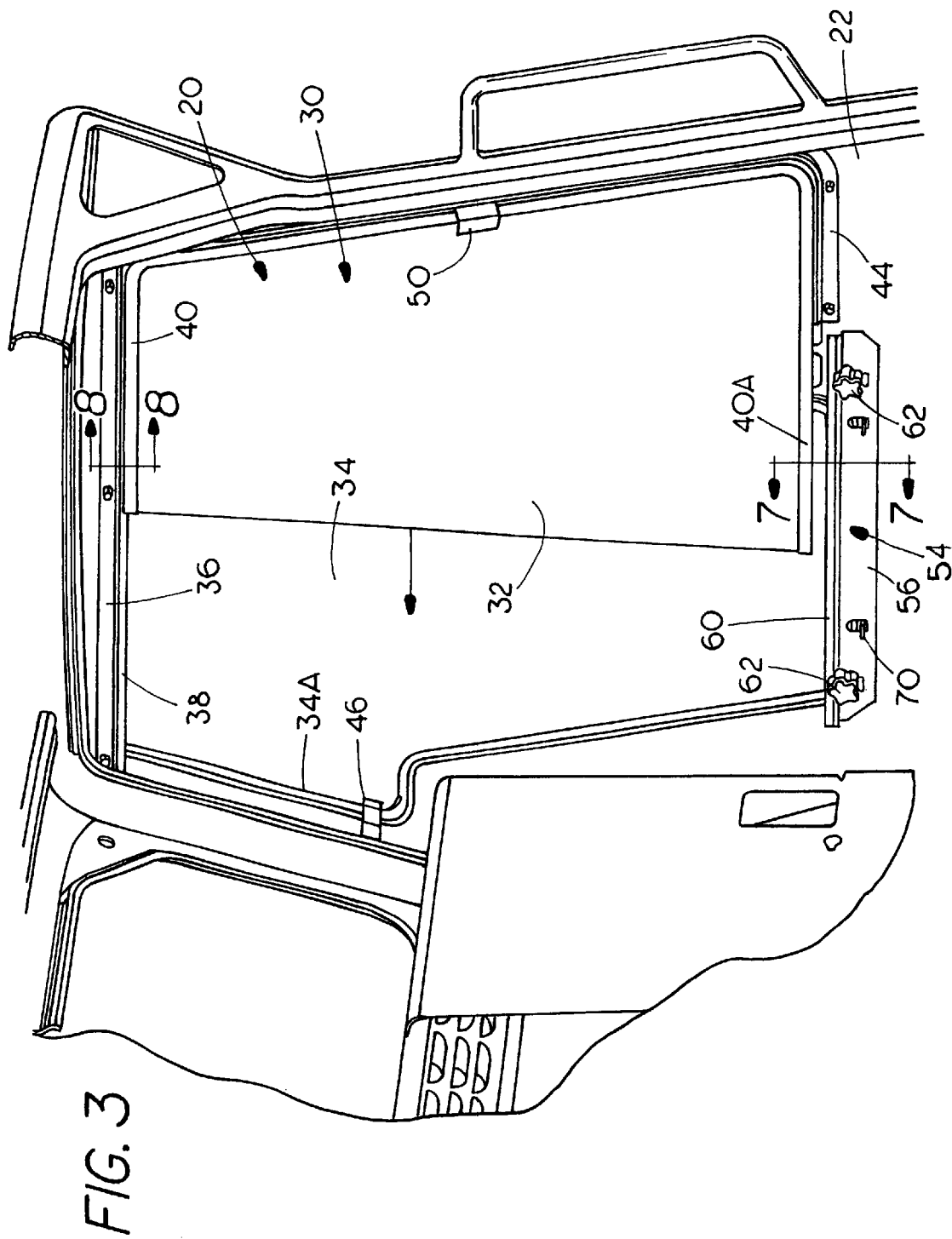
FIG. 3 is a view similar to FIG. 2, with a lower frame track section in a release position.

A latch handle 50 is provided along the forward edge of the sliding panel 32, so that the sliding panel can be held closed or released and slid back and forth along its track. In the installed position of the window assembly 30, as shown in FIG. 2, the lower edge of the sliding window panel 32 is also supported on a movable track section 54 that can be moved from its working position as shown in FIG. 2, to a lowered position as shown in FIGS. 3 and 4. In its working position, as shown in FIG. 2, the movable track section 54 has a vertical leg or wall 56 held against the side wall 22 of the loader cab. As shown in FIG. 6 the side wall 22 is offset at 22D so the seal 34A on the lower edge of the fixed glass panel 34 is held between wall 56 and the cab side wall 22.

The track section 54 has an off-set wall section 58 that extends at right angles to the cab wall and which off-sets a track leg 60 on which the lower U-shaped channel 40A on the sliding window panel 32 is supported. The sliding window panel 32 is slidably guided on the leg 60 for sliding movement in the fore and aft directions.

A pair of threaded studs 61 are secured to the cab side wall 22 and pass through L-shaped slots 63 in the wall 56. Hand knobs 62 are threaded on the studs 61, to clamp the wall 56 against the side wall 22. In the working or clamped position shown in FIG. 2, the wall 56 will bear against the molding or seal 34A on the fixed window panel 34 and clamp it against the side wall 22. At the same time, the off-set leg 60 will provide a lower track for the slidable window panel 32 and will keep the slidable panel 32 slightly spaced from the fixed panel 34.

When a window assembly 30 is installed, the top edge of the fixed panel is held with the upper frame section 36, and with latch member 46. More than one latch 46 can be used if desired. The fixed panel 34 will be held securely and the sliding window panel 32 can be moved front to rear along track legs 38, 38A and 60 for closing the window as shown in FIG. 2. The window panel 32 can be slid rearwardly to an open position to expose the side screen openings of wall 22 so that ventilation through the screen can be obtained for the interior of the cab.

The L-shaped slots 63 on the movable track 54 are such that in the working position, the studs 61 on which the hand knobs 62 operate, will be seated in the lower horizontal legs 65 of the slots 63 so that the movable track frame portion is held in a selected first position based on the position of the studs or fasteners 61 and the leg 65 of the slots 63.

When the movable track section 54 is to be moved to a second release position where the window panels can be removed for cleaning or the like, the threaded knobs 62 are loosened and the frame track section 54 is slid laterally along slots section 65 to a position where the frame track slides downward in the vertical portions of the slots 63, thereby dropping down the offset wall 58 and track leg 60, so that the sliding window panel 32 will drop to a position where channel section 40 will clear the lower edge of the upper track leg 38 and the window panel 32 can be removed. This position can be seen in FIG. 7 where the lower edge of the movable panel has clearance above the leg 60.

Also, when the movable frame track section 54 is loosened, it will release the lower edge seal or molding 34A on the fixed window panel 34, and as can be seen in FIG. 7, the fixed panel that was clamped as shown in FIG. 5 can be dropped down between the flange or wall 56 and the side wall 22 sufficiently to release the top of the fixed panel from the top fixed frame section 36. This then will permit the fixed glass panel to be tilted slightly at the top to release it from clip or latch 46 and removed as well. The movable frame section 54 may be taken off if desired for aid in removal. The seal 40A is sufficiently resilient to permit sliding the fixed glass panel in and out, without loosening the fixed frame sections.

The movable frame track section 54 is guided in a known path by slots 63 so that when it is in its working position, not only is the fixed panel held along the lower edge by the clamping of the movable track section against the cab side wall 22, but the leg 60 of the movable track section will be in a proper position to align with the track leg of the lower fixed frame section 44 used for the sliding glass panel, so that the sliding glass panel 32 can be moved back and forth.

The fixed frame sections 36 and 44 are bolted to the inside surface of the operator enclosure or cab and provide the reference positions for holding the fixed panel 34, and for guiding the sliding window panel 32 properly. The release of the movable track section 54 by loosening the knobs 62, permits the track section 54 to be guided along the provided slots to a lowered position so that the slidable glass panel can be pulled out merely by sliding it rearwardly to overlie the movable track section and then pulled inwardly. It should be noted also that the movable track section 54 has tabs 70 which protrude into the interior of the cab and can be grasped by an operator for moving the track section between its operating position and its lowered or released position where the window panels can be removed. The window panels can be stored when they are not needed. The window panels can be replaced merely by reversing the process.

The movable track section 54 allows quick removal and installation of the window panel without having to remove numerous pieces of bolt-on window track.

The movable track section 54 with the L-shaped slots 63 is positively aligned and has thumb tabs for physically grasping the frame section or track section to move it from the installed position to the release position. When the movable track panel is moved to its window remove position, the sliding panel 32 can be moved to overlie this frame section and then withdrawn because it will no longer be supported on the frame section. The sliding panel 32 can be slid rearwardly and then down to disengage it from the top fixed window frame. The movable track section 54 length is greater than one-half the length of the window. Thus the length of movable track section 54 is greater than the fore and aft length of each of the window panels.

The fixed glass panel can be moved downward and disengaged from the top section of the fixed frame and can be removed. The L-shaped slots provides for guiding the movable frame section between its positions accurately and positively.

The window panels can be glass or other transparent material, such as plexiglass. The window can be coated or treated for control of light transmission.

Although the present invention has been described with reference to preferred embodiments, workers skilled in the art will recognize that changes may be made in form and detail without departing from the spirit and scope of the invention.

What is claimed is:

1. A frame and window assembly including a frame and a window that overlies a window opening in a wall, said window comprising a first fixed window panel extending partially across the window opening and defining a plane, and a second slidable window panel that is slidable past the fixed window panel, the frame supporting portions of said fixed window panel relative to the wall, and a track which slidably supports the slidable window panel for movement in a path parallel to the plane, said track including a movable track section which in a first position supports the slidable window panel for sliding movement, at least one support fixed to the wall, said movable track section having a guide slot mating with the at least one support to hold the movable track section in said first position and the guide slot having a portion that aligns with the at least one support upon shifting the movable track section to a released position, the movable track section in said released position being movable in a direction parallel to the plane to a position wherein an adjacent edge of the slidable window panel clears the movable track section to permit the slidable window panel to be removed from the frame and the window opening, the frame extending on selected sides of the fixed window panel, and a latch to hold at least one portion of the fixed window panel relative to the wall said window opening being covered with an open mesh, the fixed window panel and the slidable window panel being on an interior side of the wall, said wall being a side wall of a cab of a skid steer loader.

2. A frame for a fixed window panel and a sliding window panel on a cab of a skid steer loader comprising fixed window frame sections, the fixed window frame sections being adapted to retain the fixed window panel in a plane, and including top and bottom track sections for slidably guiding the sliding window panel in a path parallel to the plane, the bottom track section including a fixed portion and a bottom frame track portion which together form a window support track wall having a length to support the sliding window panel during movement between an open position and a closed position thereof, said bottom frame track portion is movable between a first position wherein the window support track wall is adapted to provide a guide for the sliding window panel and a second position where the bottom frame track portion is lowered with respect to said first position and the sliding window panel is adapted to be removed from the track sections, and wherein the bottom frame track portion has a support flange extending downwardly therefrom, the support flange having at least two support slots which receive fasteners extending perpendicular to the support flange, said support slots guiding movement of the bottom frame track portion on the fasteners between the first and second positions of the bottom frame track portion.

3. The frame of claim 2, wherein said support slots are L-shaped, and each of said support slots has a first slot section that is parallel to a direction of movement of the bottom frame track portion between the first and second positions, and a second slot section that is substantially perpendicular to the first slot section, said second slot section providing a length for slidably receiving one of the fasteners for supporting the bottom frame track portion in the second position.

4. The frame of claim 2, wherein said bottom frame track portion has a length greater than a length of an adjacent side of the sliding window panel.

5. The frame of claim 2, wherein said bottom frame track portion, when in said first position, is adapted to engage a portion of the fixed window panel and hold the portion of the fixed window panel in position.

6. The frame of claim 2, wherein said bottom frame track portion has a pair of tabs integral therewith and adapted to extend inwardly into the cab for grasping by an operator.

7. The frame of claim 2, wherein the fixed window frame sections and the bottom frame track portion have legs adapted to extend inwardly from side edges of a window opening to engage a channel guide on a periphery of the sliding window panel.

8. A frame for a window having a first fixed window panel and a second horizontally slidable window panel which is slidable relative to the first fixed window panel between an open position and a closed position, said frame adapted to be mounted on a wall around a window opening in the wall and including a top fixed frame portion and a bottom frame track section for supporting and retaining the second slidable window panel, said bottom frame track section being movable toward and away from the top fixed frame portion between a first raised position wherein the bottom frame track section is positioned for supporting the second slidable window panel for sliding between the open and closed positions of the second slidable window panel, and a second lowered position wherein the second slidable window panel is adapted to be removed from the fixed frame portion by moving a bottom edge of the second slidable window panel away from the fixed window panel, a pair of retainer studs adapted to be fixed to the wall and extend outwardly therefrom, said bottom frame track section having a flange substantially perpendicular to said studs with first guide slots adapted to be positioned parallel to a bottom edge of the second slidable window panel and receiving the studs for holding the bottom frame track section in said first raised position, and having second guide slots engaged with ends of the first guide slots and extending in a direction substantially perpendicular to said first guide slots for permitting the bottom frame track section to move away from said first raised position when the bottom track section is moved so the studs align with the second guide slots.

9. The frame of claim 8, wherein said bottom frame track section is of sufficient length such that the second slidable window panel and the first fixed window panel forming the window are adapted to be removed from the frame when the bottom frame track section is moved along the second guide slots away from said first raised position.

* * * * *

UNITED STATES PATENT AND TRADEMARK OFFICE
CERTIFICATE OF CORRECTION

PATENT NO. : 6,330,765 B1
DATED : December 18, 2001
INVENTOR(S) : Jeffrey A. Dahl It is certified that error appears in the above-identified patent and that said Letters Patent is hereby corrected as shown below:

Column 5,
Line 44, insert comma -- , -- after "wall".

Signed and Sealed this

Twenty-third Day of April, 2002

*Attest:*

JAMES E. ROGAN
*Attesting Officer*     *Director of the United States Patent and Trademark Office*